United States Patent Office 2,917,531
Patented Dec. 15, 1959

2,917,531
SYNTHESIS OF HYDROCARBONS AND OXYGEN-CONTAINING ORGANIC COMPOUNDS

Herbert Kölbel and Friedrich Engelhardt, Homberg, Niederrhein, Germany, assignors to Rheinpreussen Aktiengesellschaft fuer Bergbau und Chemie, Homberg, Niederrhein, Germany, a German corporation No Drawing. Application July 25, 1952
Serial No. 300,962

Claims priority, application Germany August 8, 1951

5 Claims. (Cl. 260—449.6)

In patent application Serial No. 160,103, filed May 4, 1950, now abandoned, a method of preparing hydrocarbons and oxygen-containing compounds from carbon monoxide and steam is described. This is effected by passing a carbon monoxide steam mixture containing at least two parts by volume carbon monoxide to each part by volume of steam, at temperatures of 150° to 350° C. and normal or increased pressure over a catalyst of the eighth group of the periodic system of elements. The catalyst must have been previously activated by treatment with carbon monoxide followed by a treatment with hydrogen or with a carbon monoxide hydrogen mixture at a temperature of 150° to 350° C.

One object of this invention is to increase the life of the catalyst in the above-mentioned method.

A further object of this invention is to increase the space time yield and the economy in catalytic carbon monoxide hydrogenation, with steam.

A still further object of this invention is to increase the yield and the catalyst life in the catalytic hydrogenation of carbon monoxide, using carbon monoxide and steam.

A still further object of this invention is the catalytic hydrogenation of carbon monoxide using water for the dual purpose of effecting the hydrogenation and controlling the reaction heat. These, and still further objects will become apparent from the following description:

It has now been found that this conversion can be effected with particular advantage with catalysts, the base metal of which is present in the form of the nitrides. The conversion of the metals into nitrides can be effected in the known manner, as, for example, by conversion with ammonia. These catalysts have the great advantage over the contact agents previously used in that they will, to a far-reaching extent, reduce the undesired separation of elemental carbon which frequently leads to a premature inhibition of the activity of the catalyst. The particularly favorable behavior of the nitrides in the method of the invention was in no way to be foreseen. Rather, it was to be assumed that the nitride of the iron would, for example, greatly hydrolyze with the steam under the reaction conditions used.

The practical importance of the catalysts of the present invention is shown by the comparison of the following two examples.

*Example 1*

Over an alkalized Fe-Cu-catalyst electrolytic hydrogen is passed first of all for 3 hours at 400° C. with a volumetric velocity of 1000 m.³/hr. (NTP) per m.³ catalyst space. Thereupon the catalyst is treated for 3 hours at 300° C. with ammonia at a volumetric velocity of 1000 m.³/hr. (NTP) per m.³ catalyst space. In this manner there is obtained a catalyst consisting to the extent of 50% of nitride of the statistical formula $Fe_{1.8}N$. If this contact substance is treated at 10 atmospheres gauge with a CO/steam mixture in the ratio of 3:1.25, it exhibits over a period of 300 hours at 230° C. a constant CO conversion of 95%, and after this period of time a C content of 6.5%. By catalyst space there is meant the portion of the reaction space filled with the catalyst.

*Example 2*

If, with the other conditions the same, the contact substance is not converted into nitride, but is pretreated with CO and thereupon with $N_2$, it is necessary in order to maintain a constant CO conversion of 95% for 300 hours to increase the temperature from 230° C. to 240° C. Furthermore, after this period of time, the catalyst has a carbon content of 15.2%.

It has furthermore been found that the volumetric velocity of the carbon monoxide steam mixture used for the conversion can be very substantially increased if the operating pressure is raised. This dependence on pressure of the conversion efficiency of the catalyst was in no way expected from the previous findings made, for instance, in connection with the hydrogenation of carbon monoxide with hydrogen by the Fischer-Tropsch method with stationary catalysts. Rather it was expected on the basis of these findings that the catalyst activity in the hydrogenation of carbon monoxide would not be influenced by pressure, as was set forth in the literature. It is therefore entirely surprising and unexpected that in accordance with the invention a relationship exists between the operating pressure used and the maximum volumetric velocity of the gas.

It has been found that the volumetric velocity (expressed in volumetric units of gas per hour referred to volumetric units of catalyst) of the carbon monoxide steam mixture can always amount to more than 9 times the operating pressure (expressed in atmospheres) without the conversion of carbon monoxide with steam dropping to less than 90%. Particularly favorable results are obtained if the volumetric ratio is 9 to 14 times the operating pressure.

In the operating range at which the volumetric velocity is less than 9 times the operating pressure, the catalyst or the catalyst space is only very incompletely utilized, and, due to the excessively short time of stay, there is the danger of decomposition of the carbon monoxide into carbon; furthermore, under these operating conditions the catalyst tends toward the formation of methane. If the volumetric velocity is selected too high as compared to the pressure, unsatisfactory conversions of the carbon monoxide with steam are obtained.

By the described adaptation of the volumetric velocity to the operating pressure, it is possible to utilize the catalysts' space to the best advantage with an optimum gas rate of flow, so that optimum results are obtained with regard to the space time yield and the economy of the process. The invention will be further explained by the following example:

*Example 3*

Over an Fe-Mg-kieselguhr catalyst which had been reduced for 72 hours at a temperature of 200 to 260° C. with a gas mixture consisting of one part by volume of carbon monoxide and 2 parts by volume of hydrogen, a mixture of carbon monoxide and steam in the ratio of 3:1.25 was conducted at 230° C. The operating pressure was increased stepwise by steps of 10 atmospheres in the region from 10 to 70 atmospheres, and the volumetric velocity was set at 9 times and preferably 9 to 14 times the operating pressure. Despite the increase of the volumetric velocity from an initial value of 175 at 10 atmospheres to 800 at 70 atmospheres, the carbon monoxide conversion did not drop below 90%, as can be noted from the following table.

| Pressure in Atmospheres | 10 | 20 | 30 | 40 | 50 | 60 | 70 |
|---|---|---|---|---|---|---|---|
| Volumetric velocity in volumetric units of gas/hour referred to volumetric units of catalyst in m.³ of gas per hour per m.³ of catalyst space | 175 | 240 | 350 | 420 | 610 | 720 | 800 |
| Volumetric velocity: Pressure | 17.5 | 12.0 | 11.7 | 10.5 | 12.2 | 12.0 | 11.4 |
| Carbon monoxide conversion in percent by volume | 90.5 | 90.8 | 91.5 | 92.3 | 90.6 | 92.4 | 91.3 |

In accordance with the said patent application, at least two parts by volume of carbon monoxide should be used for each part by volume of steam. It has now been furthermore found that in order to obtain maximum yields of hydrocarbons and alcohols, the ratio of steam to carbon monoxide in the initial mixture should preferably be within very definite narrow limits. This is surprising, inasmuch as in the previously known methods of carbon monoxide hydrogenation with hydrogen, it is possible to select the hydrogen-carbon monoxide ratio of the initial gas within wide limits. Thus, as is well known, there are used both gas mixtures containing two parts by volume of hydrogen per part by volume of CO, and gas mixtures containing two parts by volume of CO per part by volume of hydrogen, i.e., the ratios are completely reversed. This, however, is a great disadvantage, inasmuch as is well known, in these methods maximum yields can only be obtained if the ratio of the initial gas is set in the same ratio in which it is worked by the catalyst. For reasons which are known per se, however, this is not always feasible.

In order to obtain maximum yields of hydrocarbons and oxygen-containing organic compounds, it has been found to be advantageous to adjust the ratio of steam to carbon monoxide between one part by volume of steam to three parts by volume of carbon monoxide and one part by volume steam to two parts by volume carbon monoxide, i.e., the particularly preferred $H_2O/CO$ ratio is between one-third and one-half.

If it is desired to produce predominantly hydrocarbons, it is advisable to select the lower limit, i.e., a steam-carbon monoxide ratio of 1:3. If, on the other hand, it is desired to obtain predominantly alcohols, it is necessary to use a synthesis mixture the steam-carbon monoxide ratio of which is higher than 1:3. For this purpose there is furthermore indicated the use of pressures higher than 20 atmospheres.

If steam-carbon monoxide mixtures of a ratio greater than one-half are used, for example 1:1, the yield drops very substantially even with high CO conversion and complete $CO/H_2O$ utilization.

In the following example there is described the formation of hydrocarbons:

*Example 4*

The catalyst used is an Fe-Cu-kieselguhr catalyst made alkaline with potassium permanganate and containing 10 parts magnesium, 10 parts copper, 60 parts kieselguhr and 2 parts $K_2CO_3$ per 100 parts by weight of iron. For its preparation, an aqueous solution of Fe($NO_3$)$_3$, Mg($NO_3$)$_2$ and Cu($NO_3$)$_2$ containing 5% iron by weight is precipitated after the addition of 60 parts kieselguhr at the boiling point with the stoichiometric quantity of sodium carbonate in aqueous solution. The precipitation mixture is boiled for a short time and then filtered, and the precipitate is washed with 70 to 90 times the quantity of boiling water referred to the quantity of iron. Thereupon the residue is formed into a paste with a small amount of water, mixed well with an aqueous solution of potassium carbonate (2 parts by weight $K_2CO_3$ to 100 parts by weight Fe) and dried at 110° C.

Before being placed in use, the catalyst must be brought into the active state. For this purpose, a CO—$H_2$ mixture containing 2 parts by volume $H_2$ to each part by volume of CO is conducted at a temperature of 270° C. over the catalyst for 24 hours at normal pressure with a volumetric velocity of 100, i.e. 100 cubic meters (NTP) CO—$H_2$ mixture per hour and per m.³ of catalyst space.

Over the catalyst which has thus been pretreated there is passed at a pressure of 10 atmospheres in one case a steam-carbon monoxide mixture of a ratio of 1:3 and in another case a similar mixture of a ratio of 1:1.5. The temperature is 230° C., the volumetric velocity 100, i.e. 100 m.³ $H_2O/CO$ mixture per hour per m.³ of catalyst volume.

In the following table the results are compared with each other:

DEPENDENCE OF THE HYDROCARBON YIELD IN THE SYNTHESIS FROM STEAM AND CARBON MONOXIDE AS A FUNCTION OF THE $H_2O/CO$ RATIO OF THE INITIAL MIXTURE

| $H_2O:CO$ in the Synthesis Mixture | Percent by Vol. Conversion | $H_2O/CO$ Consumption | Yield grams hydrocarbons/m.³ (NTP) CO |
|---|---|---|---|
| 1:3 | 94.5 | 1:3 | 185.3 |
| 1:1.15 | 93.5 | 1:1.15 | 95.1 |

With approximately the same CO conversion and complete $H_2O/CO$ utilization, the hydrocarbon yield drops from 185 grams to 95 grams when the $H_2O/CO$ ratio of the initial mixture is increased from 1:3 to 1:1.5.

It was furthermore found that the maintaining of the limits set forth for the $H_2O/CO$ ratio of the initial gas is necessary not only to obtain maximum yields, but, in addition to this, the dependable operation of the catalyst is only possible in this range. If there is used an $H_2O/CO$ ratio which is smaller than one-third, and therefore is outside the limit, in other words, if CO is present in excess, the result with longer operation will be in the separation of carbon with a resulting blocking and paralysis of the catalyst. If the $H_2O/CO$ ratio is selected greater than one-half, excess steam is present, and the catalyst will be destroyed by the steam due to oxidation. It is therefore necessary to adjust the $H_2O/CO$ ratio in the synthesis mixture in such a manner that the degree of reduction of the catalyst or its content of metal and compounds of a metallic nature which is of decisive importance with respect to its activity is not reduced and that a given carbon content of the catalyst is not exceeded. This is obtained by adjusting the synthesis mixture within the limits set forth.

The influence of the water in the carbon monoxide steam mixture on its oxidation action was investigated on the basis of a reduced Fe-Cu-alkali catalyst not containing any carrier. The Fe-Cu-catalyst used is free of carrier substances and contains 0.1 part by weight copper and 0.2 part by weight potassium carbonate per 100 parts by weight of iron. For its preparation an aqueous solution of Fe($NO_3$)$_3$ and Cu($NO_3$)$_2$ containing 5% by weight of Fe is precipitated at the boiling point with the stoichiometric quantity of sodium carbonate in aqueous solution. The precipitation mixture is boiled for a short time (a few minutes), filtered, and the precipitate is then washed with 70 to 90 times the quantity of boiling water (referred to the quantity of iron). Thereupon the residue is formed into a paste with a small amount of water, mixed well with an aqueous solution of potassium carbonate (0.25 part by weight $K_2CO_3$ per 100 parts by weight Fe) and dried at 110° C.

In order to convert the catalyst into the active state, carbon monoxide is passed over it for 24 hours at normal pressure and a temperature of 270° C. with a volumetric velocity of 100 m.³/hr. (NTP) per m.³ catalyst space and thereupon hydrogen is conducted over it at the same temperature and volumetric velocity at normal pressure for 24 hours. The degree of reduction of the catalyst, i.e., its content of metallic iron referred to the total iron as a function of the steam-carbon monoxide ratio of the initial mixture was in each case determined after an operating period of 70 hours at 235° C. with a volumetric velocity of 100 m.³/hr. (NTP) per m.³ catalyst space. The degree of reduction of the catalyst was considered a measure of its activity. A decrease in the degree of reduction indicates an oxidation which proceeds parallel with a reduction of the activity inasmuch as the carbon monoxide activation in this case proceeds only in connection with compounds having the character of a metal. These experiments show that with a steam-carbon monoxide ratio of 3:3 the degree of reduction of the catalyst had dropped from a value of originally 73 to 8%. At a ratio of $H_2O/CO$ of 1.75:3 there can still be observed noticeable oxidation; the degree of reduction has dropped to 64%. Only starting with an amount of water of 1.5 to 3 parts by volume carbon monoxide is there practically no further decrease of the degree of reduction, i.e. no oxidation.

During the further course of the development, it was found that the quantity of water required for reaction with carbon monoxide can be sprayed in liquid form into the reaction chamber. This method of the invention has the great advantage that the reaction heat released during the reaction between the carbon monoxide and the steam is used to the greater extent for converting the water from the liquid into the gaseous state, i.e., it can be removed from the system as heat of evaporation.

To be sure, it is known from the literature to use liquid water in various other syntheses in order to remove the heat of reaction. This water, however, in no way participates in the synthesis and in many cases represents an impediment with respect to the desired reaction. The utilization, effected in the method of the present application, of the heat of evaporation of a reaction component to lead off the heat of reaction, is entirely novel and was in no way to be expected. By the invention there is obtained a substantial, technical improvement in that the cooling devices required for the removal are eliminated in whole or in part.

The invention is not limited to a specific embodiment of the synthesis from steam and carbon monoxide. It is applicable both with stationary catalyst and in the liquid phase, i.e., when the catalyst is present as a fine suspension in oil, as well as in so-called moving bed catalysis where the catalyst is held by the gas flow in a fog-like state of suspension. However, the invention has proven particularly advantageous for the carrying out of the synthesis in liquid phase operation.

An injection of the quantity of liquid water required for reaction with carbon monoxide into the reaction chamber can be effected both in a single batch injection as well as in measured quantities at different parts of the reaction space. It depends on the operating conditions provided in each individual case.

In the following example there is described an experiment in liquid phase operation in which the water is injected into the catalyst oil suspension at two different places.

*Example 5*

About 800 grams of a carrier-free Fe-Cu-alkali catalyst, the composition and preparation of which has been described above (see column 4, lines 52–74) are ground to a fine dust in a ball mill and suspended in about 4 kg. of Fischer-Tropsch oil of a boiling range between 300° and 340° C. Through this catalyst oil suspension which is located in a vertical reaction tube of a length of about 4 meters, 400 liters of carbon monoxide/hour are conducted for about 20 hours at 4 atmospheres and 270° C. in order to form the catalyst. After this period of time, the pressure is increased to 11 atmospheres, the temperature decreased to 240° C. and the quantity of CO passed through increased to 100 liters/hour. If now by means of a pressure pump there is sprayed into the reaction chamber so much liquid water of a temperature of 30° C. that 18 grams of water/3 mols of carbon monoxide are present, and if this quantity of water is added in the manner that two-thirds of the water is introduced at the lower part and one-third in the center of the reaction chamber, 94% of the carbon monoxide will react with the water, forming 189 grams of hydrocarbons per cubic meter (NTP) carbon monoxide.

We claim:

1. In the method for the preparation of hydrocarbons and oxygen-containing organic compounds by the catalytic reaction of carbon monoxide and steam in the substantial absence of hydrogen, the improvement which comprises intimately contacting carbon monoxide with steam at a temperature of about 150°–350° C. in the presence of a catalyst containing a metal of the eighth group of the periodic system substantially in the form of its nitride, and recovering the synthesis products formed.

2. Improvement according to claim 1, in which said contacting is effected with the ratio of steam to carbon monoxide of about 1:2 to 1:3 by volume.

3. Improvement according to claim 1, in which said contacting is effected at a volumetric velocity of carbon monoxide and steam in cubic meters per hour per cubic meter of catalyst of about 9 to 14 times the operating pressure in atmospheres.

4. Improvement according to claim 1, in which said intimate contacting is effected by passing carbon monoxide and liquid water into a reaction zone in the presence of said catalyst.

5. Improvement according to claim 4, in which said liquid water is introduced in at least two different places in said reaction zone.

References Cited in the file of this patent

UNITED STATES PATENTS

| | | |
|---|---|---|
| 1,841,910 | Pier | Jan. 19, 1932 |
| 2,546,570 | Vance | Mar. 27, 1951 |
| 2,576,858 | Rubin | Nov. 27, 1951 |
| 2,579,663 | Gilbert | Dec. 25, 1951 |
| 2,588,452 | Layn | Mar. 11, 1952 |
| 2,629,728 | Anderson et al. | Feb. 24, 1953 |

FOREIGN PATENTS

| | | |
|---|---|---|
| 469,618 | Great Britain | July 29, 1937 |
| 707,972 | Great Britain | Apr. 28, 1954 |

OTHER REFERENCES

Anderson et al., Jour. Amer. Chem. Soc., vol. 72, pp. 3502–3508, August 1950.